United States Patent [19]

Saeed

[11] Patent Number: 4,804,057

[45] Date of Patent: Feb. 14, 1989

[54] POWER-ASSISTED STEERING GEAR

[75] Inventor: Abdul R. Saeed, Markgroningen, Fed. Rep. of Germany

[73] Assignee: Robert Bosch GmbH, Stuttgart, Fed. Rep. of Germany

[21] Appl. No.: 40,669

[22] Filed: Apr. 21, 1987

[30] Foreign Application Priority Data

Aug. 7, 1986 [DE] Fed. Rep. of Germany ....... 3626686

[51] Int. Cl.$^4$ .............................................. B62D 5/04
[52] U.S. Cl. .................................... 180/142; 180/79.1
[58] Field of Search ............... 180/79.1, 79, 146, 141, 180/142; 318/488, 489

[56] References Cited

U.S. PATENT DOCUMENTS 3,983,953  10/1976  Bayle ................................. 180/79.1
4,687,976  8/1987   Shimizu ............................. 180/79.1
4,688,655  8/1987   Shimizu ............................. 180/79.1

FOREIGN PATENT DOCUMENTS 141963    8/1983   Japan ................................ 180/79.1
183352   10/1983   Japan ................................ 180/79.1
2161030   1/1986   United Kingdom ............... 180/79.1

Primary Examiner—David M. Mitchell
Assistant Examiner—Everett G. Diederiks, Jr.
Attorney, Agent, or Firm—Edwin E. Greigg

[57] ABSTRACT

The invention relates to a power-assisted vehicle steering gear wherein a rotor is mounted directly on the pitman shaft via a coupling. The rotor rotates in a housing inner bore under the influence of circulating magnetic attraction in such a way that it is enabled to supply a torque to the pitman shaft.

13 Claims, 2 Drawing Sheets

POWER-ASSISTED STEERING GEAR

BACKGROUND OF THE INVENTION

The invention relates to a power-assisted steering gear for a vehicle. A power-assisted steering gear of this type is already known (U.S. Pat. No. 2,021,706).

In the case of this known device the pitman shaft includes two coupling disks which are designed to mesh with the pinion of an electromotor when power assistance is needed. However, in spite of this simple design, a special coupling and a special electromotor are still needed to produce the additional power and supply it to the pitman shaft.

OBJECT AND SUMMARY OF THE INVENTION

The power-assisted steering gear set forth herein requires neither a coupling provided with coupling disks nor an electromotor to supply the electrical power to the pitman shaft. A further advantage is that the power-assisted steering gear has a low rotational speed and a high torque.

Other objects, features and advantages of the invention are represented in the drawings and will be described hereinafter.

BRIEF DESCRIPTION OF THE DRAWINGS

The drawings show an embodiment of the invention which will be described in more detail hereinafter.

DESCRIPTION OF THE PREFERRED EMBODIMENT

Figure 1:
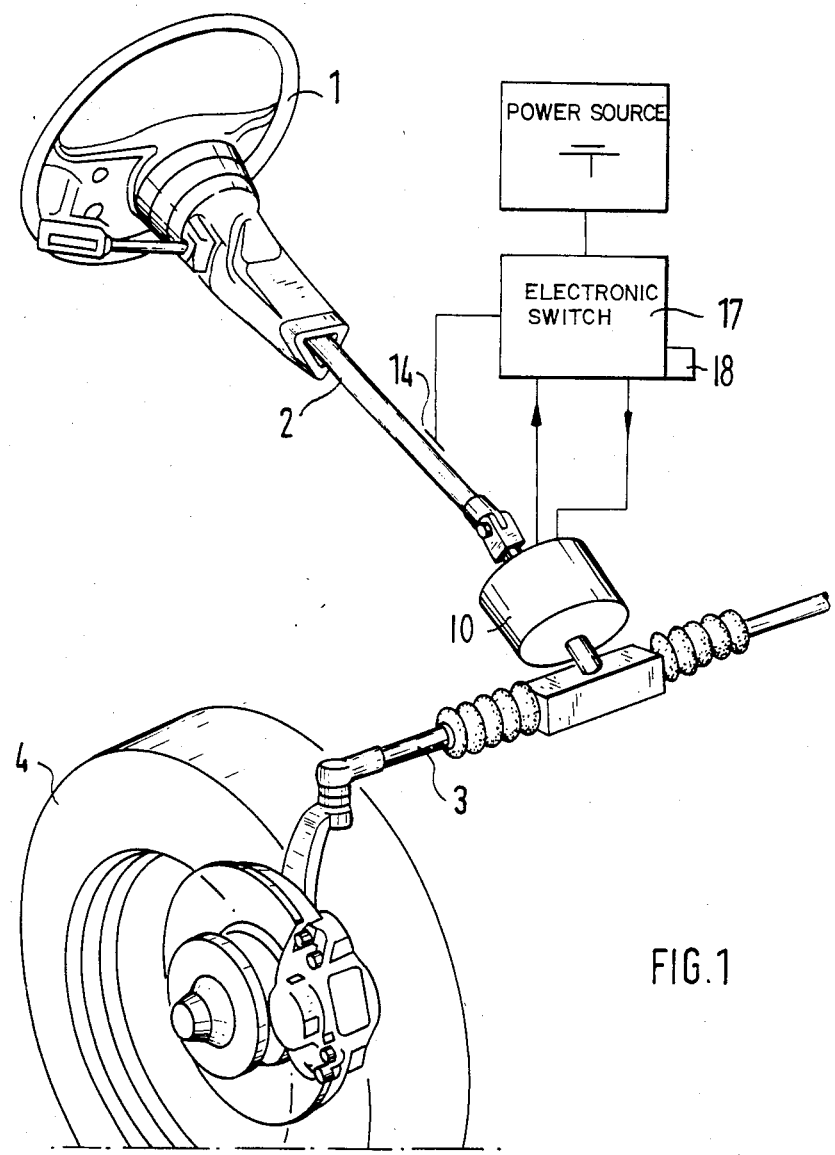
FIG. 1 is a diagram of the power-assisted steering device.

A vehicle comprises a steering wheel 1 which is disposed at an upper end of a pitman shaft 2. At its lower end, the pitman shaft 2 is connected to a steering linkage 3 which is used to control the steering wheels 4. The pitman shaft is provided in its middle portion with an equiaxial coupling part 5 to obtain a rotary connection with a rotor 6.

Figure 2:
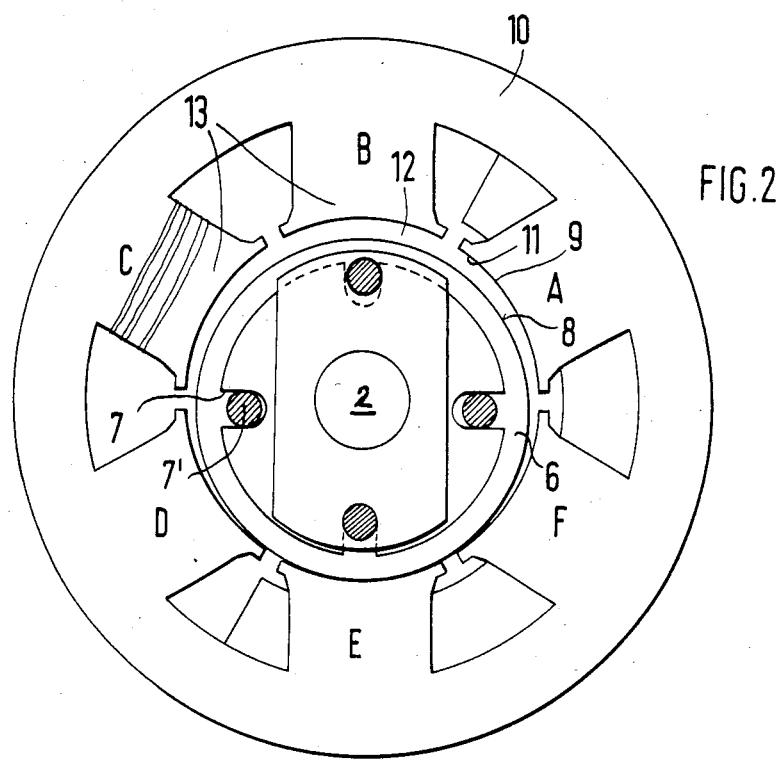
FIG. 2 is a cross-section through the pitman shaft with coupling and magnetic device.
Figure 3:
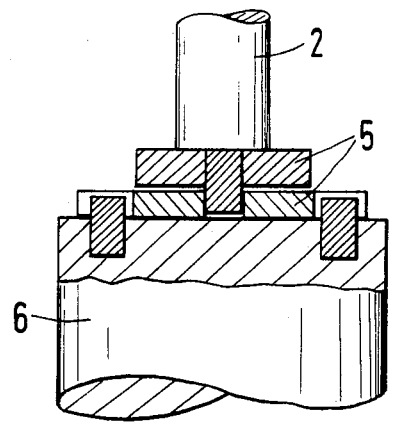
FIG. 3 is a side view of the rotor and coupling.

As indicated in FIG. 2, the coupling 5 consists of a coupling designed to allow for radial play of the rotor 6 in every direction. The said play is made possible by recesses 7 and by pins 7' cooperating with the side faces of the recesses 7.

The rotor has a cylindrical covering surface 8, by which it is inserted in a bore 9 of a fixed housing 10. The diameter of the inner bore 9 is larger than the outer diameter of the rotor 6 and thus a gap 12 is produced between an inner face 11 of the housing bore 9 and the rotor surface 8. Six magnetic poles 13, designated by the capital letters A–F, are uniformly distributed on the periphery of the fixed housing 10. A different number of poles may be provided, but there must be at least three.

A torque sensor 14, which monitors the force effective at the steering wheel 1 and supplies it to an electronic switching device 17, is provided on the pitman shaft 2. The electronic switching device 17 receives current from a power source such as a battery and supplies a current to the magnetic poles, magnetic field lines are shown in section C. Sensors of any well known type determine the particular position of the rotor 6 in the housing 10 and supply the information to the electronic device. To begin rotation of the rotor 6, a pulse generator 18 is started. This generator 18 connects the magnetic poles in succession in the circumferential direction according to the position of the rotor 6. The intensity of the current is determined by the torque exerted on the steering wheel. For example, first the magnetic poles D, E and F are connected and the rotor 6 is influenced by these. Then, magnetic pole D is disconnected and magnetic pole A is connected. Thereafter magnetic pole E is disconnected, and so on in the circumferential direction. Therefore, as the trailing magnetic pole of three successive poles is disconnected from the circuit the leading magnetic pole of three successive poles are connected into the circuit.

In this manner the surface 8 of the rotor 6 rides on the inner face 11 of the housing 1 and, as the face 8 of the rotor in the circumferential direction is smaller than the inner face 11 of the housing, the rotor 6 functions as an armature and turns about its axis to the left or the right oppositely to the direction of the pulse feed path. The smaller the rotor in relation to the inner surface of the housing, the more rapid the rotation is produced. This rotation is supplied to the pitman shaft 1 via the coupling 5 as power-assisted torque.

An advantage of this power-assistance to the pitman shaft 1 according to the invention is that a brushless motor can be used as the steering assist.

The device has a low rotational speed and therefore does not require a reduction gear. Furthermore, the low mass moment of inertia of the device allows for rapid starting and stopping. The torque is high and therefore the power assistance especially effective.

A further advantage of the device is that the steering without the power assist feature only exhibits slight additional friction since only the rotor 6 must be co-rotated and that only a slight additional mass moment of inertia is produced.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A power-assisted vehicle steering gear comprising a pitman shaft coupled to an electrical power assist means connected between a steering wheel and a steering linkage which controls turning of the wheels, said electrical power-assist device including a housing, said housing forming a multi-polar magnetic device having a inner face (11), a rotor (6) in a bore in said housing which rotor is surrounded by said multi-polar magnetic device and includes a rotor face (8) opposite said inner face of said housing, said pitman shaft engaging one end of said rotor (6) for rotation thereof and for steering of said wheels, and said housing inner face (11) is disposed opposite said rotor face (8) in a power transmitting relationship and that a torque supplied to said pitman shaft (2) is reduced corresponding to a difference in the circumferential length of the housing face (11) and that of the rotor face (8).

2. A power-assisted vehicle steering gear as claimed in claim 1, characterized in that said pitman shaft (2) is provided with a coaxial coupling part (5) which engages said rotor (6) via recesses (7) allowing for some radial play within said housing.

3. A power-assisted vehicle steering gear as claimed in claim 2, in which said multi-polar magnetic device comprises a plurality of poles (A-F) which are uniformly distributed on the periphery of said bore which are successively activatable.

4. A power-assisted steering gear as claimed in claim 3, in which said coupling part (5) of the pitman shaft (2) and the corresponding rotor recesses (7) comprise a coupling which allows radial play of said rotor in all directions.

5. A power-assisted steering gear as claimed in claim 3, which includes sensors that detect the position of the rotor (6) and supply this information to an electronic switching device (17) which controls the position of said rotor (6).

6. A power-assisted steering gear as claimed in claim 2, in which said coupling part (5) of the pitman shaft (2) and the corresponding rotor recesses (7) comprise a coupling which allows radial play of said rotor in all directions.

7. A power-assisted steering gear as claimed in claim 6, which includes sensors that detect the position of the rotor (6) and supply this information to an electronic switching device (17) which controls the position of said rotor (6).

8. A power-assisted steering gear as claimed in claim 2, which includes sensors that detect the position of the rotor (6) and supply this information to an electronic switching device (17) which controls the position of said rotor (6).

9. A power-assisted steering gear as claimed in claim 3, which includes a sensor which detects torque of said pitman shaft and supplies this information to said electronic switching device for controlling said rotor.

10. A power-assisted vehicle steering gear as claimed in claim 1, in which said multi-polar magnetic device comprises a plurality of poles (A-F) which are uniformly distributed on the periphery of said bore which are successively activatable.

11. A power-assisted steering gear as claimed in claim 10, which includes sensors that detect the position of the rotor (6) and supply this information to an electronic switching device (17) which controls the position of said rotor (6).

12. A power-assisted steering gear as claimed in claim 11, which includes a sensor which detects torque of said pitman shaft and supplies this information to said electronic switching device for controlling said rotor.

13. A power-assisted steering gear as claimed in claim 1, which includes sensors that detect the position of the rotor (6) and supply this information to an electronic switching device (17) which controls the position of said rotor (6).

* * * * *